Aug. 11, 1942.   R. S. LANGDON   2,292,881
LOGGING UNIT
Filed June 3, 1941   3 Sheets-Sheet 3

Inventor
ROBERT S. LANGDON
Ralph S. Bassett
Attorney

Patented Aug. 11, 1942

2,292,881

UNITED STATES PATENT OFFICE 2,292,881

LOGGING UNIT

Robert S. Langdon, Seattle, Wash., assignor to Pacific Car and Foundry Company, Renton, Wash.

Application June 3, 1941, Serial No. 396,469

11 Claims. (Cl. 214—65.3)

The object of this invention is to provide a yarder so constructed as to be adaptable for connection to a tractor in such a manner as to distribute the load reaction to the tractor equally at both tractor axles with any load and with any line angle.

A further object of the invention is to so connect a yarder and a tractor that the load carried by the reach and the load carried by the boom will be transmitted to the tractor in a manner to maintain the latter evenly balanced under all circumstances.

A further object of the invention is to provide a yarder in which the boom is entirely free of the reach except for its single adjustable swivel supported by virtue of connecting struts.

A further object of the invention is to provide a hitch between a tractor and a yarder at such points and of such a type that maximum maneuverability will be secured.

A further object of the invention is to provide a double hitch for a yarder.

A further object of the invention is to so associate a yarder with a tractor that the load itself will effect stabilization of the tractor.

Still another object resides in providing a logging apparatus including a tractor having forwardly and rearwardly positioned axles, and associated with the tractor a yarder, connecting the yarder with the tractor by means of a reach which extends substantially in a plane intersecting the axles of the tractor, connecting the boom to the tractor above the reach connection, arranging supporting struts between the boom and the reach to permit relative adjustment between these parts.

Other objects will more fully hereinafter appear by reference to the accompanying drawings forming a part of the specification and wherein like characters of reference designate corresponding parts throughout the several views in which:

Fig. 5 is a diagrammatic elevation showing the assembly.

Figure 1:
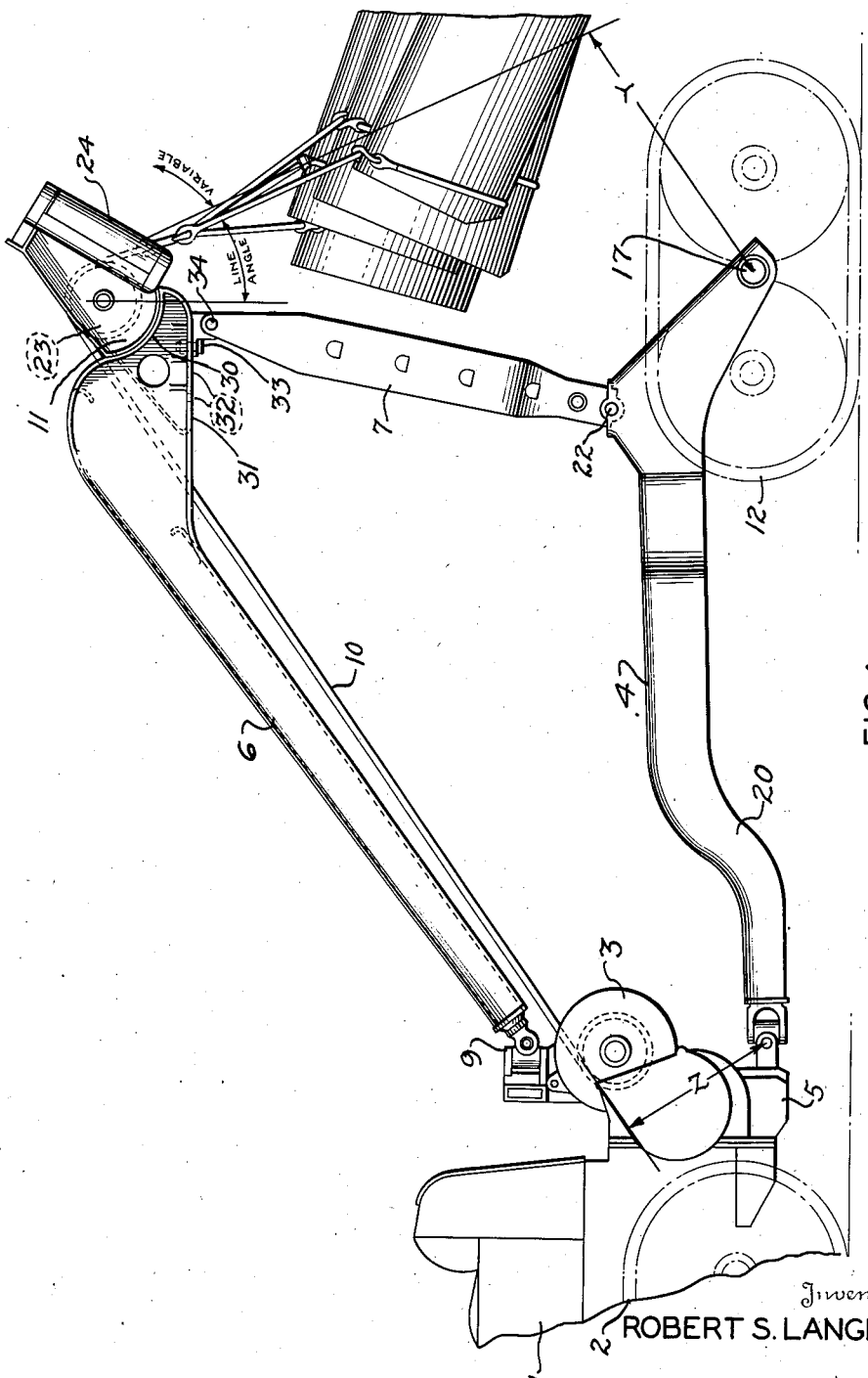
Fig. 1 is a side elevation of one form of the invention.

Broadly, the elements involved include the tractor 1, the tractor track or crawler 2, the hoist mechanism 3 and then the yarder assembly including the reach 4 coupled to the usual drawbar 5, the boom 6 supported on the strut 7 by means of the adjustable connection 8, the boom connection 9 to the hoist case, independent of the reach and either below or above the cable 10 leading from the hoist mechanism 3 to the fairlead 11 and the yarder trackway 12.

As to the specific construction of the related parts, it will be noted that certain of the features are conventional. In the first place, the tractor will involve the usual axles 15 and 16, suitably spaced to accommodate the endless belt 2 used to supply the necessary traction and maneuverability.

Supported in the usual manner at the rear portion of the tractor 1 is a hoist or winding drum 3, the casing of which is sufficiently sturdy to mount the swivel or universal 9 for connection with the boom 6.

Figure 3:
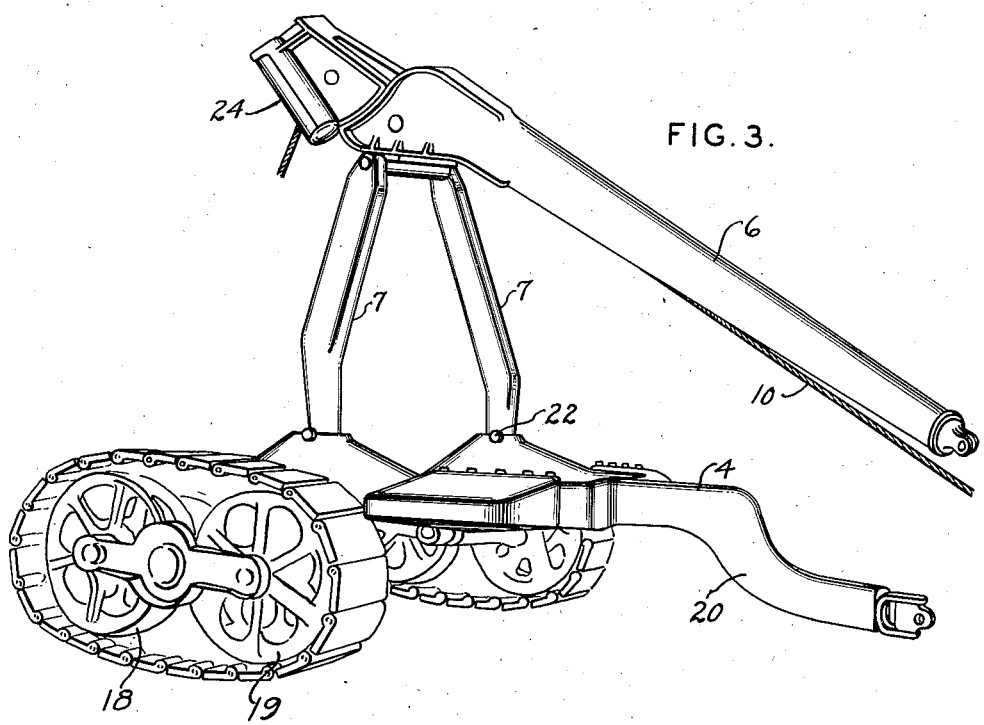
Fig. 3 is a perspective of a yarder structure.
Figure 4:
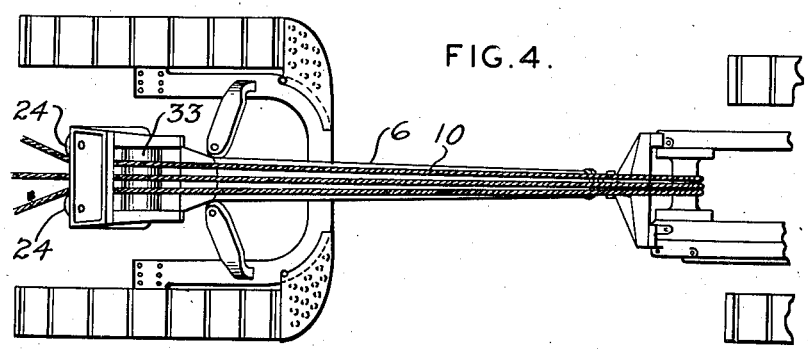
Fig. 4 is a top plan view.

The yarder structure includes the reach indicated generally by reference character 4 and including the U-shaped portion whose leg extremities extend downwardly to the supporting hubs or stub shafts 17 journaled in the usual manner to the carrying frames of the endless tracks 12. The tracks are of such construction and arrangement as will facilitate the essential operations. The endless tracks are carried by the guide wheels shown at 18 and 19 in Fig. 3. The tongue of the reach 4 extends forwardly from an intermediate point of the U-shaped portion, and is bent downwardly, as at 20, and forwardly for alignment with the lower reach coupling 5 at the rear of the tractor 1. The coupling 5 is of standard universal type and is substantially aligned with the axis of the axles of the tractor. This frame may be cast or fabricated material as desired to secure the maximum strength.

Adjacent the free extremities of the arms of the U-shaped portion of the reach frame are the elevated supporting surfaces 21 for hinge pin bearing 22, the pin 22 extending transversely and through the lower end portions of the inwardly inclined vertical struts 7. The lower ends of the struts 7 may have a series of pin bearings to provide adjustment of these parts.

Figure 2:
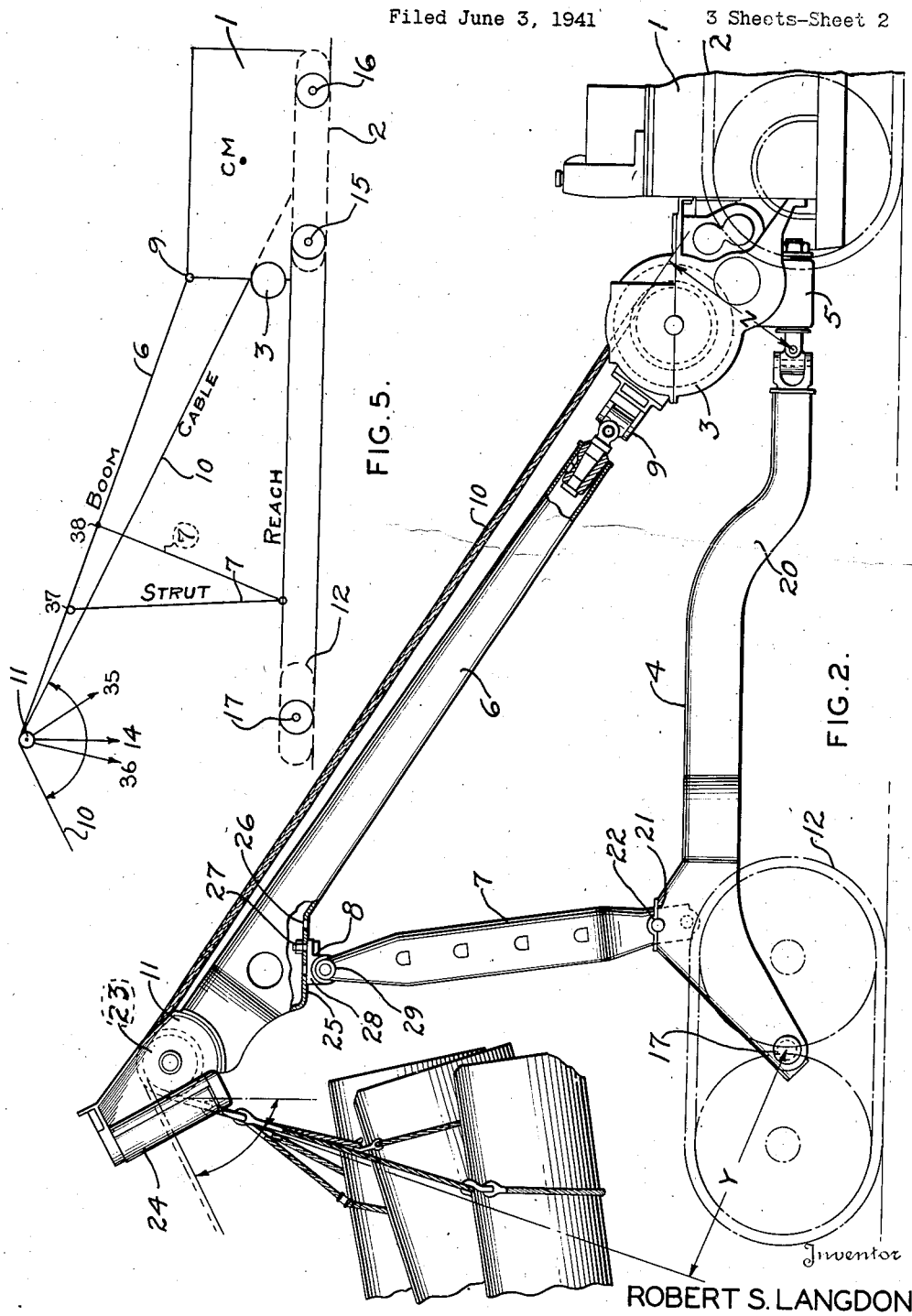
Fig. 2 is a side elevation of another form of the invention.

The universal connection 9 carried by the casing of the hoist mechanism connects with the boom 6. Two forms of booms are illustrated. In Fig. 2 the boom is of hollow form throughout the shank portion and including the lower end which is universally connected to the hoist casing. The upper portion of the boom of Fig. 2 terminates in the fairlead or cable guide of a type common in the art. This includes the cable supporting pulley or roller 23 and the guide rollers 24 suitably mounted in the required supporting assembly. Adjacent the outer end of the boom is the flat under-face 25 perforated at 26 to receive swiveling bolt 27 of the strut hinge 28. The strut hinge 28 includes the transverse pivot pin 29 which provides the essential relative movement between the parts. In Fig. 2 the cable 10 extends from the hoist drum 3 through the fairlead 11 and supports the load as shown.

In Fig. 1, the boom is structurally different at its upper free end which, at its upper surface, is concave at 30 to provide the required seating surface, for the fairlead, while the under surface 31 is relatively long and extends horizontally to provide for the adjustment of the strut 7. It will be noted that the perforations 32 receive the vertical swiveling bolt or pin 33 to connect the strut hinge as in the other form.

There is provided a yarder with a boom entirely free of the reach, except at the strut connection, the boom connection with the tractor being so associated with the reach connection, and the load as carried by the cable, that maximum efficiency is present in maneuvering and manipulation.

For all practical purposes it can be said that the tractor as a whole is lifted an amount proportional to the line load and distance Y (yarder axle to the log line extended). The object of this invention is to distribute this lift equally between the front and rear tractor axles, with any load and with any line angle (the line angle being a function of Y).

The load varies as the number and size of logs, weight of the wood in the logs and as the resistance of the logs on the ground at their rear end during transit. The line angle will vary with the slope of the ground, condition of the ground (wet, dry, mud, ruts, dust, etc.) roughness of the bark, length of logs, shape of logs, and whether butts or tops are dragging on the ground. The line angle will vary under normal logging conditions from 0 to 90°.

In the present standard yarder, as shown for instance in my former Patent No. 2,035,134 (Figure 1), wherein there is a single connection between the tractor and yarder, the front of the tractor is lifted by the line load an amount proportional to the distance Z (the distance from the coupler pin to the drum line extended—see Figure 1 of this application for patent), and also proportional to the line load. With a fixed load, this front end lift remains fairly constant for all line angles, there being a slight tendency for the lift to decrease as the line angle increases.

This more or less fixed front end action leaves the rear end of the tractor to take the full variations of lift as set up by the continuous variations of Y.

At the lesser line angles, the weight taken off the front end of the tractor is transferred to the rear axle of the tractor, also a part of the yarder axle load is transferred ahead to the rear tractor axle.

In logging conditions where Y is small and the lift of the rear end proportionally small, such as down hill logging, the weight thus added to the rear is excessive. The tractor actually "rides its heels," that is, the front end of the tracks scarcely touch the ground while the rear end is excessively loaded, making the tractor hard to maneuver and causing undue wear on the rear track supports or rollers.

If, on the other hand, the line angle is great as in up hill logging, or in pulling the logs out of the brush, the front end lift is slightly decreased as explained above and the rear end of the tractor may be lifted clear off the ground due to the increased dimension Y.

There are various things that can be done to change this tractor lift, for instance the line can be underwound on the drum (not a desirable condition because the operator cannot see the line spool onto the drum), this cuts down the front end lift and exaggerates the rear end lift. Or the fairlead can be moved back further behind the yarder track axles—this lifts the tractor rear an amount about equal to the front end lift under normal conditions—but it also takes a larger portion of the tractor weight off the ground, and decreases its pulling effort.

With the present standard yarders there is no way of distributing the lift caused by the yarder and its load between the two ends of the tractor so as to give us maximum maneuverability with a maximum of the tractor's weight on the ground to pull with.

To overcome the above faults the boom is connected to the hoist above the reach connection, its distance above being dependent on the distance from the reach coupler point to the drum line extended and to the weight of the tractor, some tractors having a greater or less proportion of their weight in the front end. The greater the vertical distance between the reach and boom connection the greater the reaction on the frnt end, as will be explained later.

The boom is supported near its rear end by a pair of struts, the lower ends of which are hinged to the reach forward of its rear extremity.

The connection of the struts to the boom is made swiveling both vertically and horizontally to allow for complete movement of the boom with respect to the struts. Adjustment is provided as will be explained later.

A complete force analysis is practically impossible because of the various variables entering into it. However, if we make a rough study of the functions of each part at two different line angles, we can better understand the principles involved.

If the line angle is such that the resultant force on the fairlead is at 35 (Figure 5) in which case Y and the line angle are a minimum, the resultant force at the boom connection 9 would be forward and upward, the upward is of little value but the forward force would force the front end of the tractor down, to counteract the lifting force of the line. Result—less lift of the front end, less load on the rear end and a balanced tractor.

Obviously if the top end of the strut were moved back far enough so that the strut 7 paralleled resultant force 35, the forward component of the forces at the boom connection 9 would be decreased.

Conversely, if the top boom connection was moved forward to say 38, the forward component of the force at the boom connection 9 would be greatly increased, giving us a much increased counteraction to the line load. Similar results may be attained by moving the bottom of the strut in the opposite direction.

Consider now a line angle whose resultant force is represented by 36 (Figure 5). Since this force is at an angle away from strut 7, the boom forces at 9 would be up and back to give us an increased lift of the front end. Adjustment of the strut would give only an increase or decrease to this lift.

Thus as the line angle increases from minimum to maximum, the forces exerted by the boom at 9 gradually change from a maximum forward and up to a maximum backward and up, at the lesser angles to counteract the front end lift exerted by the line load and at the greater angles to supplement the line load, while the load at the rear end of the tractor has been decreased a proportional amount at lesser line angles and increased likewise a proportional amount at the greater line angles.

Thus there is a controlled distribution of the lift due to the yarder and its load between the two ends of the tractor with any line angle and any line load, the vertical boom adjustment to make the distribution and the top strut adjustment to control the proportions of the distributed lift between the two ends of the tractor. The adjustments will be used only to balance the various combinations of tractors and hoists.

In order to more clearly understand the forces acting in the construction the following analysis is made and from this the ultimate result will be more obvious.

Considering the boom 6 alone it acts always as a lever of the first class, fulcrumed on the strut 7 with the load applied at the outer cable extremity 14. Since this load is always in the downward direction the reaction at the tractor end of the boom will at all times be upward and will tend to lift the rearward end of the tractor 1 about the front axle 16 as a fulcrum. As the center of mass of the tractor will be between the axles 15 and 16, the boom 6 reaction will operate on the tractor 1 as a second class lever which is fulcrumed at the front axle 16 and with the load between the axle and the point of lift namely, the connection of the boom 6 to the tractor. Movement of the strut 7 along the boom will, of necessity, change the ratio of the boom lever arms and accordingly change the boom lifting effect on the tractor. The load acting on the boom as a fulcrum will be made up of two parts, one, the vertical weight of the load, and two, the apparent weight due to the drag of the load and the tendency to straighten the cable 10.

Considering the reach 4 alone, it is a lever of the second class fulcrumed at the carrying axle 17 and with the load applied by the strut 7 between the fulcrum and the connection of the reach to the tractor. Since the strut 7 is always in compression the reaction of the reach 4 on the tractor will be in a downward direction, this will tend to load the rear axle 15 of the tractor and lift the front axle 16. Thus, the reach alone is a second class lever and operates on the tractor as a first class lever with the load applied to the tractor at the rear with the rear axle serving as a fulcrum tending to lift the weight of the tractor concentrated at the center of mass. The load imparted to the reach 4 by the strut 7 will be determined by the drag tending to straighten the cable.

Combining the boom and reach reactions on the tractor it will be found that they tend to cancel each other, that is, the reach tends to load the rear axle 15 and lift the front axle 16, while the boom tends to lift the rear axle 15 and load the front axle 16. By properly proportioning the lever arms of the boom 6 and reach 4 and choosing their connection to the tractor the cancelling effect of the two may be adjusted so as to hold the tractor substantially level and with equal axle loadings.

In addition to the boom 6, the reach reactions to the cable load must be considered and the location of the cable drum 3 properly positioned on the tractor 1 so as to properly combine with boom 6 and reach 4 reactions as to give as nearly a constant and equal axle loading as is possible. In considering the location of the cable drum 3 the manner of winding the cable on the drum must be considered as well as the amount of cable on the drum during forward motion of the tractor and load. Considering the cable alone, it for any given instant may be considered as anchored to the tractor at a point where the line of the cable intersects the line of joining the tractor axles. It will be seen that this apparent point of attachment of the cable to the tractor will shift as the cable is overwound or underwound on the drum. In the case of an overwound cable as in Figure 2 the apparent point of attachment will shift toward the front axle as the cable is wound on the drum, while in the case of an underwound cable, the apparent point of attachment will shift towards the rear axle of the tractor as cable is wound on the drum. Also the apparent point of attachment will be shifted by adjustment of the point of attachment of the strut 7 and boom 6. In any case the cable drum 3 will be attached to the tractor 1 so that the effective point of cable attachment will always fall between the axles and will be so chosen as to give as nearly as possible an equal axle loading. The cable will always act in tension and accordingly will tend to lift the tractor from its axles. If the effective point of attachment is to the rear of the center of mass, then the rear axle 15 is lifted and the front axle 16 loaded, whereas if the effective point of attachment falls ahead of the center of mass, then the front axle 16 is lifted and the rear axle 15 loaded.

It will be seen from the preceding analysis of the separate elements acting on the tractor that it will be possible to so proportion the boom and reach and the effective point of cable attachment so that for a given load and drag the tractor will be absolutely equally loaded on both axles. It will be apparent that numerous variables must be considered in arriving at the correct location of cable drums and connection of the boom and reach to the tractor in order to obtain the ideal condition. The variables that must be considered are the variable effective point of attachment of the cable to the tractor and the extremely variable load on the cable. This latter load will be made up of a fairly constant true load due to the weight of the articles being handled as they are snaked through brush, dirt and over logs, rocks and other obstructions. The drag load will, of course, be greatly increased when the inclosed angle of the cable is greater, for then the articles will have a greater portion of their weight resting on the ground and the straightening tendency of the cable will be much greater. Accordingly, it will be seen that the tension in the cable, and in consequence, its lifting effect upon the tractor, will be directly proportional to the inclosed angle of the cable, also to the effective point of attachment of the cable to the tractor.

In any case the rear axle loading tendency of the reach must be so combined with the rear axle lifting tendency of the boom, as to properly combine with the lifting tendency of the cable to produce an equal axle loading on the tractor under average load and drag conditions, As suggested above to work out the force diagrams of this structure is almost impossible, made so by a variable line angle and line load, but perhaps this simple statement will suffice; with the present invention we are able to oppose the variable downward action of the reach coupling with a similarly variable force by the boom at its connection with the hoist acting forward and up. Or we might say that we force the front end of the tractor down with a force variable with the line angle and load. The net result is a nearly equal lift of the tractor, front and rear, with any line angle or load. Small variations in the location of the boom connection to the hoist have little effect, but as little as a five inch forward or backward variation in the strut connections to the boom or reach makes a great difference in the tractor balance. To move top strut connection forward, (or bottom connections back), forces the lift of the front of the tractor below that of the rear, and vice versa to move the top strut connection back (or bottom forward) forces the rear lift below that of the front, but in both cases the plotted curves remain nearly parallel. It would seem advantageous to lift the rear a little more than the front, to take off of the tractor the weight we have added by the hoist and yarder, but we find there is a little more total lift with a greater rear end lift than there is with a greater front end lift as before described. The reach connection below the hoist gives us complete maneuverability, the boom connection to the hoist gives us control of the tractor balance.

The total lift of a tractor for all practical purposes can be said to be proportional to distance $y$. The distance from the track axle to the log line extended, and $y$ varies as the resistance of the logs on the ground at their far end; thus, $y$ varies with the slope of the ground, length of logs, size of logs, bark, rocks, mud, dust, etc., and in addition we must pull the logs out of the brush or off a hill which creates the greatest line angle, approaching 90°. The front end lift we have found varies only with the load and at a fixed load varies almost directly as distance $z$ (distance from the coupler pin to the drum line). Since $z$ is fixed except for overwind or underwound it is impossible to effect any control of the front end lift. We have found that the rear end lift varies directly as the load and directly as distance Y, both variable.

The foregoing is obtained by the mechanical construction shown, which, to summarize, includes a two-point connection to the tractor or hoist which is fastened to the tractor, the low connection being between the yarder tracks and the tractor for maneuverability, and the higher connection being between the boom and the hoist for tractor balance. The arrangement and connection of the struts at their respective ends being such that the struts may be adjusted with respect to the boom or may be adjusted with respect to the reach, both adjustments either being fore or aft of the assembly. In addition, there is the vertical pin connection of the top portions of the struts to the boom which permit the boom to swivel. The swivel motion of the boom is further facilitated by the universal or swiveling connection of the boom to the hoist and the reach to the hoist. The lower ends of the struts are placed forward of the track axles to permit maximum log clearance. It will be noted that there is no specific or exact location given on the hoist for the boom hitch because this location is essentially variable to suit the different tractors, some of which are lighter or heavier in front as compared to the rear.

I claim:

1. A logging apparatus including a tractor having a drawbar, a hoist for said tractor, a load carrying axle, a reach connecting said drawbar with said axle, a boom connected to said tractor for pivotal movement at a point substantially higher than said drawbar, said boom extending rearwardly to a point above said axle, means carried by said reach for supporting said boom and means for adjusting said support means along said boom.

2. A logging apparatus including a tractor, a load carrying axle, a reach connecting said tractor and said axle, a boom movable independent of said reach and connected to said tractor and extending to a point above said axle, a sheave mounted on said boom, a load carrying line supported by said sheave and connected to the tractor, strut means for supporting said boom from said reach, and means for connecting said strut means to said boom at varying points between the sheave and the tractor so as to change the effective leverage.

3. Logging apparatus including a tractor, yarder wheels, a reach connecting said tractor and said yarder wheels, said reach being connected to said tractor by vertical and horizontal pivot means, a boom connected to said tractor by means of a swivel point, struts carried by said reach and connected thereto by horizontal pivot means, said struts being connected to said boom by vertical and horizontal pivot means.

4. Logging apparatus including a tractor, yarder wheels, a reach connecting said tractor and said yarder wheels, said reach being connected to said tractor by vertical and horizontal pivot means, a boom connected to said tractor by means of a swivel joint, struts carried by said reach and connected thereto by horizontal pivot means, said struts being connected to said boom by vertical and horizontal pivot means, a fairlead mounted on said boom, a drum line guided by said fairlead and a hoist carried by said tractor.

5. Logging apparatus including a tractor, yarder wheels, a reach connecting said tractor with said yarder wheels, a boom movable in a vertical plane independent of said reach and connected to said tractor at a point substantially above the connection of said tractor with said reach, struts supporting said boom from said reach, a sheave carried by said boom, a drum line guided by said sheave, said boom, struts, reach and tractor forming a four-jointed linkage whereby the pulling action of the tractor will be transmitted through the reach to the yarder wheels and the weight of the load carried by the drum line will act on the end of said boom to assist in balancing the weight of the tractor.

6. Logging mechanism including a tractor having a hoist, a boom connected to said tractor, a roller mounted on the end of the boom opposite the tractor, a reach movable independent of said boom and connected to said tractor, yarder wheels supporting said reach, strut means connected to said boom between the tractor and the roller, said strut means being supported by said reach, a drum line connected to said hoist and passing over said roller to carry the logs, the connection of said boom and said reach with said tractor being at substantially different levels whereby the drag of the logs and the drag of the yarder wheels will be balanced against each other to assist in maintaining the balance of the tractor.

7. Logging apparatus including a tractor having forwardly and rearwardly positioned axles, yarder wheels connected to said tractor by means of a reach, load carrying mechanism connected to said tractor by means of a drum line and a boom, a connection of said boom and drum line being at a substantially higher level than the connection of the reach, and said boom being movable independent of said reach and the force resultant of the boom and the drum line passing between the axles of the tractor.

8. Logging apparatus including a tractor having forwardly and rearwardly positioned axles, yarder wheels connected to said tractor by means of a reach, load carrying mechanism connected to said tractor by means of a drum line and a boom, a connection of said boom and drum line being at a substantially higher level than the connection of the reach, the force resultant of the boom and the drum line passing between the axles of the tractor, the load of the yarder wheels acting as a balance against the load of the load carrying mechanism to assist in evenly distributing the lift between the front and rear axles of the tractor.

9. A logging apparatus including a tractor having front and rear axles, a yarder, a reach connecting the yarder with said tractor at a point below the axis of the tractor axles, a hoist drum mounted on the tractor above the reach connection, a boom supported by a strut, said strut connecting the reach and boom to permit adjustment of the boom leverage, said boom being connected to the tractor above the reach connection, and a cable extending from the hoist drum to load carrying position beyond the outer extremity of the boom, said cable lying in a plane intersecting a plane extending through the axis of said tractor axles.

10. A logging apparatus including a tractor, a yarder including a reach, said reach having swivel connection with said tractor, a boom, said boom having a swivel connection with the tractor above the reach connection, and a strut interposed between the reach and the boom, said strut being connected to the reach for vertical adjustment, and being connected to the boom by means of a swivel, the swivel being shiftable fore and aft of the boom.

11. In a logging apparatus including a tractor having front and rear axles, a yarder including front and rear axles, a reach connecting the yarder by means of a swivel with said tractor in the plane of the tractor axles, a hoist drum mounted on the tractor above the reach connection, a boom having a swivel connection with said tractor, a strut adjustably connected to the reach and supporting the outer portion of said boom, said reach being swiveled to said boom, and a cable extending from the hoist drum to a load carrying position beyond the outer extremity of the boom.

ROBERT S. LANGDON.